United States Patent
Ji et al.

(10) Patent No.: US 11,871,746 B2
(45) Date of Patent: Jan. 16, 2024

(54) GROWTH ENHANCEMENT OF PLANT BY USING CATIONIC GUARS

(71) Applicant: RHODIA OPERATIONS, Paris (FR)

(72) Inventors: Peng Fei Ji, Shanghai (CN); Jean-Christophe Castaing, Sevres (FR); Marie-Pierre Labeau, Sevres (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/538,083

(22) PCT Filed: Dec. 22, 2015

(86) PCT No.: PCT/CN2015/098172
§ 371 (c)(1),
(2) Date: Jun. 20, 2017

(87) PCT Pub. No.: WO2016/101862
PCT Pub. Date: Jun. 30, 2016

(65) Prior Publication Data
US 2017/0354145 A1   Dec. 14, 2017

(30) Foreign Application Priority Data

Dec. 23, 2014 (WO) ................ PCT/CN2014/094667

(51) Int. Cl.
| | | |
|---|---|---|
| A01N 25/00 | (2006.01) | |
| A01N 25/12 | (2006.01) | |
| A01N 43/16 | (2006.01) | |

(52) U.S. Cl.
CPC ............. *A01N 43/16* (2013.01); *A01N 25/00* (2013.01); *A01N 25/12* (2013.01)

(58) Field of Classification Search
CPC .................. A01N 43/16; A01N 25/12
See application file for complete search history.

(56) References Cited

U.S. PATENT DOCUMENTS

| 4,746,690 A * | 5/1988 | Busch ........................ C08L 5/00 424/70.13 |
|---|---|---|
| 5,787,640 A | 8/1998 | Duke |
| 9,096,793 B2 * | 8/2015 | Cristobal ............... C09K 17/52 |
| 9,795,134 B2 * | 10/2017 | Ji ......................... A01N 43/653 |
| 2011/0003936 A1 * | 1/2011 | Chen ........................ C08L 5/04 536/63 |
| 2011/0123563 A1 * | 5/2011 | Langella ................ A61K 8/737 424/195.18 |
| 2012/0220454 A1 * | 8/2012 | Chen ..................... A01N 25/00 504/100 |

FOREIGN PATENT DOCUMENTS

| CN | 102115503 A | 7/2011 |
|---|---|---|
| CN | 104717879 A | 6/2015 |
| WO | 2004071195 A1 | 8/2004 |
| WO | 2012118795 A2 | 9/2012 |
| WO | 2014005319 A1 | 1/2014 |
| WO | 2014005555 A1 | 1/2014 |
| WO | 2014005555 A1 | 9/2014 |

OTHER PUBLICATIONS

Li et al., Preparing a cationic guar gum comprising placing solid alkali into dispersing agent, preparing alkaline solution, and adding guar gum, obtaining dispersing solution, and dripping cationic etherifying agent solution, reacting, and neutralizing, 2010, Derwent Abstract CN101768225, 2 pages. (Year: 2010).*
Machine Translation for CN104717879A.

* cited by examiner

Primary Examiner — Alton N Pryor
(74) Attorney, Agent, or Firm — Osha Bergman Watanabe & Burton LLP

(57) ABSTRACT

The present invention provides a method for increasing the growth of a plant by contacting a seed of the plant with a composition comprising a cationic guar having an average molecular weight of between 2,000 Daltons and 90,000 Daltons. The present invention also provides a seed treated with a cationic guar having an average molecular weight of between 2,000 Daltons and 90,000 Daltons.

15 Claims, No Drawings

GROWTH ENHANCEMENT OF PLANT BY USING CATIONIC GUARS

This application claims priority to PCT international application No. PCT/CN2014/094667 filed on 23 Dec. 2014, the whole content of this application being incorporated herein by reference for all purposes.

TECHNICAL FIELD

The present invention relates to a method for increasing the growth of a plant by contacting a seed of said plant with a composition comprising at least a cationic guar. In particular, the method permits the plant to develop its biomass and reach its maturity. The invention also relates to a seed treatment composition used in such method.

BACKGROUND ART

Economic demands, environmental concerns, and ecological considerations require that farmers continually improve their agricultural practices. These economic demands require that farmers utilize the most cost efficient practices in order to generate the highest crop yields, while using fewer chemicals with lower toxicity as environmental considerations. Finally, ecological considerations have led to integrated pest management systems which further challenge the farmer's ability to produce crop yields and quality within the economic constraints prevalent in today's market.

Plant, soil and seed treatments are used on almost every commercial crop on the market today. In this era of intensified agriculture, the seed is modified to obtain higher crop yields and high quality.

As examples, WO patent application WO2004071195 discloses a method to increase crop yield and accelerating crop emergence comprising administering a composition including a polysaccharide on a seed or seed piece of said crop or to a soil in which said crop is cultivated.

U.S. Pat. No. 5,554,445 describes a seed encrusting method by use of microcrystalline chitosan in a form of liquid dispersion to form a highly adhesive, permeable, biodegradable and bioactive film on the seed surface. The seed encrusting preparation consists of providing a uniform coating of the seed with a mixture of seed, encrusting agent and/or dyes and/or nutrient media that the preparation is optionally combined with. However the germination power mentioned in this prior art is clearly not sufficient as the number of sprouted plants may be increased but without a significant improvement of growth.

WO patent application WO2014005555 discloses a method to increase the growth of a plant by coating a seed of said plant with a composition comprising at least a cationic guar having an average molecular weight of between about 100,000 Daltons and 3,500,000 Daltons. The cationic guars disclosed in WO2014005555 have relatively high molecular weight. One problem is that when such cationic guars are prepared in an aqueous composition for coating the seeds, the aqueous composition may become very thick and have poor fluidity. This problem pertains even if the cationic guars are present at low concentrations in the aqueous composition. This will cause problems for the application of the aqueous composition for coating the seeds.

There is a need to develop a satisfactory method for improving the germination rate and the crop yield of a plant, and enhancing the growth of the plant as well, notably a method which can permit the plant to develop and increase its biomass.

SUMMARY OF INVENTION

It appears that now it's possible to provide a seed treatment method which allows increasing the growth of a plant, notably the method allows the plant to develop its biomass and reach its maturity. The method also permits to increase the number of pods, the germination rate, the weight of grains and size, the length of roots and the height of seedlings, the general yield of the produced plant, even in conditions wherein irrigation is insufficient.

In one aspect, the present invention provides a method for increasing the growth of a plant which comprises at least the step of contacting a seed of said plant with a composition comprising at least a cationic guar having an average molecular weight of between about 2,000 Daltons and about 90,000 Daltons.

In one embodiment, the method comprises coating the seed of said plant with said composition. Then the coated seed may be applied onto or in the soil, notably in order to set in contact the coated seed with the ground.

In another embodiment, the method may be an "in situ coating" method. Notably, such method comprises the steps of implanting in a hole or a furrow in the soil a seed of a plant, and then applying a composition comprising at least a cationic guar having an average molecular weight of between about 2,000 Daltons and about 90,000 Daltons to surround or partially surround, or to be adjacent to the seed of said, so that the seed of said plant can come into contact with said composition, notably with said cationic guar.

In still another embodiment, the method comprises administering a composition comprising at least a cationic guar having an average molecular weight of between about 2,000 Daltons and about 90,000 Daltons to a soil in which a plant is cultivated.

The method of the present invention also permits decreasing the detrimental effects of fungicides and herbicides that negatively impact germination rate and growth of the plants.

The method of the present invention can be easily carried out using conventional and commercially available equipment.

DETAILED DESCRIPTION

Throughout the description, including the claims, the term "comprising one" or "comprising a" should be understood as being synonymous with the term "comprising at least one", unless otherwise specified, "between" and "from . . . to . . ." should be understood as being inclusive of the limits.

As used herein, "weight percent," "wt %," "percent by weight," "% by weight," and variations thereof refer to the concentration of a substance as the weight of that substance divided by the total weight of the composition and multiplied by 100.

"Alkyl" as used herein means a straight chain or branched saturated aliphatic hydrocarbon group and is intended to include both "unsubstituted alkyl" and "substituted alkyl", the latter of which refers to alkyl moieties having substituents (such as hydroxyl group and halogen group) replacing a hydrogen on one or more carbon atoms of the alkyl group. "Alkenyl", as used herein, refers to an aliphatic group containing at least one double bond and is intended to include both "unsubstituted alkenyls" and "substituted alkenyls", the latter of which refers to alkenyl moieties having substituents (such as hydroxyl group and halogen group) replacing a hydrogen on one or more carbon atoms of the alkenyl group.

In one aspect, the present invention provides a method for increasing the growth of a plant which comprises the step of contacting a seed of said plant with a composition comprising at least a cationic guar having an average molecular weight of between about 2,000 Daltons and about 90,000 Daltons.

In one embodiment, the seed is a raw seed that has not been treated by any agent. In another embodiment, the seed is one that has been treated with an agent other than the composition according to the present invention, for example, a seed which has been treated with an agrochemical such as a fungicide and an insecticide.

Guars are polysaccharides composed of the sugars galactose and mannose. The backbone is a linear chain of β 1,4-linked mannose residues to which galactose residues are 1,6-linked at every second mannose in average, forming short side units.

Within the context of the present invention, "cationic guar" means a cationic derivative of a guar. "Cationic" means permanently positively charged whatever the pH or non permanently charged, e.g. a derivative that can be cationic below a given pH and neutral above that pH. Notably, the cationic guar is a chemically modified guar derivative which shows or potentially shows a net positive charge in a pH neutral aqueous medium.

Plant according to the present invention may be an agricultural and horticultural plant, a shrub, a tree or a grass, hereinafter sometimes collectively referred to as plant.

Seed according to the present invention may be of a crop or a plant species including but not being limited to corn (*Zea mays*), *Brassica* sp. (e.g., *B. napus, B. rapa, B. juncea*), alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Cofea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, vegetables, ornamentals, woody plants such as conifers and deciduous trees, squash, pumpkin, hemp, zucchini, apple, pear, quince, melon, plum, cherry, peach, nectarine, apricot, strawberry, grape, raspberry, blackberry, soybean, *sorghum*, sugarcane, rapeseed, clover, carrot, and *Arabidopsis thaliana*.

In one embodiment, the seed is of a vegetable species including but not being limited to tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), cauliflower, broccoli, turnip, radish, spinach, asparagus, onion, garlic, pepper, celery, and members of the genus *Cucumis* such as cucumber (*C. sativus*), cantaloupe (*C. cantalupensis*), and musk melon (*C. melo*).

In one embodiment, the seed is of an ornamental species including but not being limited to hydrangea (*Macrophylla hydrangea*), hibiscus (*Hibiscus rosasanensis*), petunias (*Petunia hybrida*), roses (*Rosa* spp.), azalea (*Rhododendron* spp.), tulips (*Tulipa* spp.), daffodils (*Narcissus* spp.), carnation (*Dianthus caryophyllus*), poinsettia (*Euphorbia pulcherrima*), and chrysanthemum.

In one embodiment, the seed is of a conifer species including but not being limited to conifers pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

In one embodiment, the seed is of a leguminous plant species including, but not being limited to, legumes, beans and peas. Beans include guar beans, locust beans, fenugreeks, soybeans, garden beans, cowpeas, mungbeans, lima beans, fava beans, lentils, chickpeas, peas, moth beans, broad beans, kidney beans, lentil, dry beans. Legumes include, but are not limited to, *Arachis*, e.g., peanuts, *Vicia*, e.g., crown vetch, hairy vetch, adzuki bean, mung bean, and chickpea, *Lupinus*, e.g., lupine, *trifolium, Phaseolus*, e.g., common bean and lima bean, *Pisum*, e.g., field bean, *Melilotus*, e.g., clover, *Medicago*, e.g., alfalfa, *Lotus*, e.g., trefoil, lens, e.g., lentil, and false indigo. Typical forage and turf grass for use in the methods described herein include but are not limited to alfalfa, orchard grass, tall fescue, perennial ryegrass, creeping bent grass, lucerne, birdsfoot trefoil, clover, *stylosanthes* species, *lotononis bainessii*, sainfoin and redtop. Other grass species include barley, wheat, oat, rye, orchard grass, guinea grass, *sorghum* or turf grass plant.

Notably, the seed is of one of the following crops and vegetables: corn, wheat, *sorghum*, soybean, tomato, cauliflower, radish, cabbage, canola, lettuce, rye grass, grass, rice, cotton, sunflower and the like.

It is understood that the term "seed" or "seedling" is not limited to a specific or particular type of species or seed. The term "seed" or "seedling" can refer to seed from a single plant species, a mixture of seed from multiple plant species, or a seed blend from various strains within a plant species. In one embodiment, the seed is a crop seed which includes but is not limited to rice, corn, wheat, barley, oats, soybean, cotton, sunflower, alfalfa, *sorghum*, rapeseed, sugarbeet, tomato, bean, carrot, tobacco or flower seeds.

The cationic guars of the present invention can be obtained by chemically modifying guars, generally natural guars, by using cationic etherifying agents. Suitable cationic etherifying agents include primary, secondary or tertiary amino groups or quaternary ammonium, sulfonium or phosphinium groups. Notably, the cationic etherifying agents are quaternary ammonium salts.

Preferably, the cationic etherifying agents are quaternary ammonium salts bearing three radicals, which may be identical or different, chosen from hydrogen, an alkyl radical containing 1 to 22 carbon atoms, more particularly 1 to 14 and advantageously 1 to 3 carbon atoms. The counterion is generally a halogen, which in one embodiment is chlorine.

The quaternary ammonium salts may be, for example: 3-chloro-2-hydroxypropyl trimethyl ammonium chloride (CHPTMAC), 2,3-epoxypropyl trimethyl ammonium chloride (EPTAC), diallyldimethyl ammonium chloride (DMDAAC) or other cationic reagents such as trimethylammoniumpropyl methacrylamide.

A typical cationic functional group in these cationic guars is trimethylammonium (2-hydroxyl) propyl, with a counter ion. Various counter ions can be utilized, including but not being limited to halides, such as chloride, fluoride, bromide, and iodide, sulfate, methylsulfate, and mixtures thereof.

The cationic guar of the present invention may be chosen in the group consisting of:
cationic hydroxyalkyl guars, such as cationic hydroxyethyl guar, cationic hydroxypropyl guar, cationic hydroxybutyl guar, and
cationic carboxyalkyl guars including cationic carboxymethyl guar, cationic alkylcarboxy guars such as cationic carboxylpropyl guar and cationic carboxybutyl guar, carboxymethylhydroxypropyl guar.

In some aspects, the cationic guar of the present invention is guar hydroxypropyltrimonium chloride or hydroxypropyl guar hydroxypropyltrimonium chloride, notably, guar hydroxypropyltrimonium chloride.

The degree of hydroxyalkylation (molar substitution or MS) of cationic guars, that is the number of alkylene oxide molecules consumed by the number of free hydroxyl functions present on the guar, may be comprised between 0 and 3, preferably between 0 and 1.7. As example, a MS of 1 may represent one ethylene oxide unit per monosaccharide unit.

The Degree of Substitution (DS) of cationic guars, that is the average number of hydroxyl groups substituted per sugar unit, may be comprised between 0.005 and 3. DS may notably be determined by titration. The cationic guar of the present invention may have a DS of between 0.005 and 2. Preferably, the cationic guar of the present invention has a DS of between 0.005 and 1. More preferably, the cationic guar of the present invention has a DS of between 0.12 and 0.5.

The Charge Density (CD) of cationic guars may be comprised between 0.01 and 4.9 meq/g, preferably between 0.4 and 2.1 meq/g. The charge density refers to the ratio of the number of positive charges per gram of polymer. For example, CD=1 meq/g means there are 0.001 charges per gram of polymer. The charge density multiplied by the polymer molecular weight determines the number of positively charged sites on a given polymer chain.

According to the present invention, the cationic guar may have an average molecular weight (Mw) of between about 2,000 Daltons and 90,000 Daltons, preferably, the cationic guar has an average molecular weight of between about 5,000 Daltons and 90,000 Daltons, more preferably, the cationic guar has an average molecular weight of between about 10,000 Daltons and 60,000 Daltons, still more preferably, the cationic guar has an average molecular weight of between about 10,000 Daltons and 50,000 Daltons.

It has been surprisingly found that plants wherein the seeds of the plants are treated with the cationic guar according to the present invention show more robust root growth than those plants wherein the seeds of the plants are treated with high molecular weight cationic guars. In the context of the present invention, high molecular weight cationic guars mean cationic guars having average molecular weight of 100,000 Daltons or above.

The cationic guar according to the present invention may be prepared by depolymerizing cationically modified guars that have high molecular weight, so as to "split" the guar polymers to desired sizes. It is appreciated that the cationic guar of the present invention may also be prepared by depolymerisation of natural guars, followed by cationization reactions to provide the polymers with cationic functionality. Various depolymerisation methods are well known in the art and may be used for the present invention, such as treatment by using peroxo compound (e.g., hydrogen peroxide) and irradiation. Examples of such methods are disclosed in U.S. Pat. Nos. 4,547,571, 6,383,344 and 7,259,192. The cationization of guars can be easily made by a skilled person using methods commonly known in the art. Various methods for providing guar gums with cationic functionality are known in the art, for example as disclosed in U.S. Pat. Pub. No. 2008/0112907. Various methods for cross-linking guars with and without cationic modification of the guars are also known, see for example U.S. Pat. Nos. 5,532,350 and 5,801,116. Alternatively, low molecular weight guars can be obtained by harvesting guar beans which are still at an early developmental stage such that the harvested guar beans contain low molecular weight natural guar gums. Then the guar gums may be subject to cationization for provide them with cationic functionality.

The composition used for the method of the present invention may comprise only one cationic guar as described above. Alternatively, the composition may comprise more than one cationic guars.

The composition may comprise a binder. The binder (or any of the layers) can be molasses, granulated sugar, alginates, karaya gum, jaguar gum, tragacanth gum, polysaccharide gum, mucilage, gelatin, polyvinyl acetates, polyvinyl acetate copolymers, polyvinyl alcohols, polyvinyl alcohol copolymers, styrene acrylate polymers, styrene butadiene polymers, celluloses (including ethylcelluloses and methylcelluloses, hydroxypropylcelluloses, hydroxymethyl celluloses, hydroxymethylpropyl-celluloses), polyvinylpyrolidones, dextrins, malto-dextrins, polysaccharides, fats, oils, proteins, gum arabics, shellacs, vinylidene chloride, vinylidene chloride copolymers, sodium lignosulfonate, calcium lignosulfonates, acrylic copolymers, starches, derivatized starches, polyvinylacrylates, zeins, carboxymethylcellulose, chitosan, polyethylene oxide, acrylimide polymers and copolymers, polyhydroxyethyl acrylate, methylacrylimide monomers, alginate, ethylcellulose, polychloroprene, syrups or any combination thereof.

The composition may also contain at least one bioactive ingredient. The bioactive ingredient can be one or more herbicides, plant growth regulators, crop dessicants, fungicides, bacteriocides, bacteriostats, insecticides, insect repellants, triazine herbicides, sulfonylurea herbicides, uracils, urea herbicides, acetanilide herbicides, organophosphonate herbicides, glyphosate salts, glyphosate esters, nitrilo oxime fungicides, imidazole fungicides, triazole fungicides, sulfenamide fungicides, dithio-carbamate fungicides, chloronated aromatic, dichloro aniline fungicides, carbamate insecticides, organo thiophosphate insecticides; perchlorinated organic insecticides, methoxychlor, miticides, propynyl sulfite, triazapentadiene miticides, chlorinated aromatic miticides, tetradifan, dinitrophenol miticides, binapacryl, or any mixture thereof.

In some aspects, the composition comprises at least a cationic guar as described above and a plant biostimulant. Plant biostimulants are usually components other than fertilizers, which affect plant growth and/or metabolism upon foliar application or when being added to soil. Plant biostimulants generally fall within one of three categories: hormone-containing products, amino acid-containing products and humic acid-containing products. Plant biostimulants are used to treat crops in a commercial setting in view of their ability to, for example, increase growth rates, decrease pest plant growth, increase stress tolerance, increase photosynthetic rate, and increase disease tolerance. Plant biostimulants are generally believed to operate by up-regulating or down-regulating plant hormones.

The composition may further comprise a defoamer. Suitable defoamers include all customary defoamers including silicone-based and those based upon perfluoroalkyl phosphinic and phosphonic acids, in particular silicone-based defoamers, such as silicone oils, for example. Defoamers most commonly used are those from the group of linear polydimethylsiloxanes having an average dynamic viscosity, measured at 255° C., in the range from 1000 to 8000 mPas (mPas=millipascal-second), usually 1200 to 6000 mPas, and containing silica. Silica includes polysilicic acids, meta-silicic acid, ortho-silicic acid, silica gel, silicic acid gels, precipitated $SiO_2$, and the like. Defoamers from the group of linear polydimethylsiloxanes contain as their chemical backbone a compound of the formula HO—[Si$(CH_3)_2$—O—]$_n$—H, in which the end groups are modified, by etherification for example, or are attached to the groups —Si$(CH_3)_3$. Non-limiting examples of defoamers of this kind are RHODORSIL® Antifoam 416 (Rhodia) and RHODORSIL® Antifoam 481 (Rhodia). Other suitable defoamers are RHODORSIL® 1824, ANTIMUSSOL 4459-2 (Clariant), Defoamer V 4459 (Clariant), SE Visk and AS EM SE 39 (Wacker). The silicone oils can also be used in the form of emulsions.

The composition may also contain other optional components which are known by a person skilled in the art for treatment of seeds, such as pigments, adjuvants, surfactants, and fertilizers.

The composition may be a solid or a liquid composition. In the case wherein the composition is solid, the composition may be in the form of a powder, a particle, an agglomerate, a flake, a granule, a pellet, a tablet, a brick, a paste, a block such as a molded block, a unit dose, or another solid form known to those of skill in the art. Preferably, the solid composition is in the form of a powder or a granule.

In some aspects, the composition is in the form of a granule. Granules containing the cationic guar may be prepared in a three-step procedure: wet granulation followed by drying and sieving. The wet granulation step notably involves introduction and mixing of cationic guar powders and a carrier, and optionally other ingredients, in granulation equipment (such as a mixing granulator). The mixing is conducted with spraying of water to the mixture. The wet granulation step will yield wet granules containing the cationic guars. The weight ratio between the carrier and the cationic guar which are to be mixed may be between 20:1 to 1:1, preferably, between 20:1 to 10:1. The water content introduced may be comprised between 10 wt % to 50 wt % based on the total weight of the wet granules. The carrier may be silicon dioxide, amorphous silica, precipitated silica, hydrated amorphous silica, precipitated silica, hydrated amorphous synthetic calcium silicate, hydrofobized precipitated silica, silica gel, sodium aluminium silicate, clay, zeolite, bentonite, layered silicate, caolim, sodium carbonate, sodium bicarbonate, sodium sulfate, sodium tripolyphosphate, sodium chloride, sodium silicate (water glass), magnesium chloride, calcium chloride, ammonium chloride, magnesium sulfate, calcium carbonate, calcium oxide, and/or calcium sulphate, or a mixture thereof. Notably, the carrier is selected from calcium chloride and calcium carbonate. The drying step notably involves drying the wet granules by using hot air flow. This step can usually be conducted in a fluid bed equipped with an air inlet and an air outlet. The sieving step may be conducted by using a vibrating plate.

The granules may have a diameter of 0.1 to 6 mm. Generally, normal granules have a diameter of 2-6 mm and micro granules have a diameter of 0.1-2 mm. Preferably, micro granules having a diameter of 0.5-1.6 mm are used.

Alternatively, the granules containing the cationic guar may be prepared by using extrusion methods well known by a person skilled in the art. The extrusion methods are described in U.S. Pat. No. 6,146,570. For example, the cationic guar and the carrier, and optionally other ingredients, may be blended with heating. The weight ratio between the carrier and the cationic guar may be between 20:1 to 1:1. Then a binder may be melted and introduced into the mixture of the cationic guar and the carrier. Then, an extrusion step may be carried out with extruder temperature maintained between 55° C. and 65° C. The soft warm granules may be formed and may be subsequently cooled below solidification point of the molten binder (at room temperature for instance) in order to obtain solid granules.

In the case that the seed treatment composition is liquid, the liquid composition may be a suspension, a dispersion, a slurry, a solution in a liquid carrier selected from water, organic solvents oils or a mixture thereof. The liquid composition may be prepared by mixing the cationic guars as described above with the liquid carrier, optionally with other components, by using conventional methods. Preferably, the liquid composition is in the form of an aqueous solution. The composition may comprise from 1 wt % to 60 wt % of the cationic guar based on the total weight of the composition. Preferably, the composition comprises from 5 wt % to 35 wt % of the cationic guar based on the total weight of the composition. In some aspects, the composition comprises from 30 wt % to 35 wt % of the cationic guar based on the total weight of the composition. When conducting seed treatment in industrial scale, it is preferred that the liquid composition used for the seed treatment contains high concentration of the cationic guar, so that less volume of the liquid composition is required to achieve the desired dosage for the treatment (i.e. the weight ratio of the cationic guar to the seeds being treated). Using small volume of the liquid composition can save costs and is less tedious. However, when the concentration of the cationic guar in the liquid composition increases, the fluidity of the liquid composition will significantly decrease. As a result, the liquid composition may become too "thick" to be effectively applied to the seed or the soil, and has poor ability to spread on the surface of the seed or in the soil as well. For example, an aqueous composition comprising 3 wt % of a high molecular weight cationic guar may already be very thick and thus have poor fluidity. One advantage of the present invention is that the cationic guar according to the present invention has relatively low molecular weight, for example, an average molecular weight of between 2,000 Daltons and 90,000 Daltons. In such case, the resulting liquid composition can maintain excellent fluidity even if the cationic guar is present at high concentrations, and therefore, such liquid composition can be conveniently used for treating the seeds or the soil. In one embodiment, the method of the present invention comprises a step in which the seed is coated with the composition as described above. Then the coated seed may be applied onto or in the soil, notably, in order to set in contact the coated seed with the ground.

Suitable coating techniques may be utilized to coat the seed or agglomeration of the seeds with the composition according to the present invention. Equipment that may be utilized for coating can include but are not limited to drum coaters, rotary coaters, tumbling drums, fluidized beds and spouted beds. It is appreciated that any suitable equipment or technique known by a person skilled in the art may be employed. The seed may be coated via a batch or continuous coating process. The seed may be coated with the composition according to the present invention which is either in solid form or liquid form. Preferably, an aqueous dispersion or solution is used.

The seeds may be separated prior to the coating step. In one embodiment, mechanical means, such as a sieve, may be employed for separating the seeds. The separated seeds can then be introduced into a coating machine having a seed reservoir. In one embodiment, the seeds are combined with the composition described herein, optionally with a binder and/or adhesive, in a mixing bowl.

In some aspects, one or more layers of coating which comprises the composition according to the present invention may be added onto the seeds or the agglomeration thereof. Outer layers can be introduced sequentially by coating the seeds or the agglomeration thereof in a rotating drum.

Agglomerators or agglomerator devices may also be utilized. Coating may be performed within a rotary coater by placing the seeds within a rotating chamber, which pushes the seeds against the inside wall of the chamber. Centrifugal forces and mixing bars placed inside the coater allow the seeds to rotate and mix with a coating layer comprising the composition according to the present invention. Binder or other coating materials can be pumped into the proximate center of the coater onto an atomizer disk that rotates along with the coating chamber. Upon hitting the atomizer disk, liquid adhesive is then directed outward in small drops onto the seeds.

Seed coating techniques also include, for example, placing the seeds in a rotating pan or drum. The seeds are then mist with water or other liquid, and then gradually a fine inert powder, e.g., diatomaceous earth, is added to the coating pan. Each misted seed becomes the center of a mass of powder, layers, or coatings that gradually increases in size. The mass is then rounded and smoothed by the tumbling action in the pan, similar to pebbles on the beach. The coating layers are compacted by compression from the weight of material in the pan. Binders often are incorporated near the end of the coating process to harden the outer layer of the mass. Binders can also reduce the amount of dust produced by the finished product in handling, shipping and sowing. Screening techniques, such as frequent hand screening, are often times utilized to eliminate blanks or doubles, and to ensure uniform size. For example, tolerance for seed coating compositions described herein can be +/−1/64 inch (0.4 mm), which is the US seed trade standard for sizing, established long before coatings were introduced. For example, coated lettuce seed is sown most frequently with a belt planter through an 8/64 inch diameter round holes in the belt. This hole size requires that the lettuce seeds coated with the composition according to the present invention can be sized over a 7.5/64 inch screen and through an 8.5/64 inch screen.

In one embodiment of the present invention, the seed may be contacted with the composition by using an "in situ coating" process, notably by implanting in a hole or a furrow in the soil a seed of a plant, and then applying the composition according to the present invention to surround or partially surround, or to be adjacent to the seed, so that the seed come into contact with the composition, notably with the cationic guar. According to the invention, the hole may notably be a hole, a cavity or a hollowed area. The seed may be one that has not been treated by any agent, or a seed that has been treated with an agrochemical (such as fungicide and insecticide) and that has not been treated with the composition of the present invention. Preferably, the composition is deposited on the carrier to provide a granule or a micro granule before being applied. The granule or the micro granule containing the cationic guar may be prepared by using the methods described above.

In still another embodiment, the method according to the present invention comprises a step of administering the composition according to the present invention to a soil in which a plant is cultivated. Then the seeds of the plant can be applied to the soil so that the seeds will come into contact with the composition, notably with the cationic guar. Notably, the composition in liquid form, such as in the form of aqueous solution/dispersion, or the composition in solid form, such as in powder or granule, may be used.

Preferably, the application of the seed and the application of the composition according to the present invention are performed mechanically. It is appreciated that either or both of the referenced applications can be performed manually as well.

In another aspect of the present invention, there is provided a seed coated with a cationic guar having an average molecular weight of between 2,000 Daltons and 90,000 Daltons. The cationic guar may be one or more selected from those described herein.

Should the disclosure of any patents, patent applications, and publications which are incorporated herein by reference conflict with the description of the present application to the extent that it may render a term unclear, the present description shall take precedence.

The following examples are included to illustrate embodiments of the invention. Needless to say, the invention is not limited to the described examples.

EXAMPLES

Example 1

Formulation

Aqueous compositions for seed treatment were prepared according to the formulations in Table 1 below:

TABLE 1

| | Formulation |
|---|---|
| Sample 1 (S1) | An aqueous solution comprising 1 wt % of a guar hydroxypropyltrimonium chloride having an average molecular weight of approximately 50,000 Daltons and a DS of 0.2 |
| Comparative Sample 1 (CS1) | An aqueous solution comprising 1 wt % of a cationic guar having an average molecular weight of approximately 1,500,000 Daltons and a DS of 0.1 |
| Comparative Sample 2 (CS2) | Water without any cationic guar |

Viscosity of the Compositions

The viscosity of the samples were measured according to the below procedure. Each sample (100 ml) was placed in a glass beaker and the viscosity was measured by Brookfield viscosity meter with No. 2 spindle and at 20 rpm shearing speed. The measurement was done at 20° C. It was found that Sample 1 1 has a viscosity of 1 to 10 cps while Comparative Sample 1 has a viscosity of 300 to 1000 cps. The composition according to the present invention has markedly lower viscosity in comparison to that comprising high molecular weight guar, therefore, is easier to process.

Enhancement of Root Growth of Corn

Corn (*Zea mays*, from commercial sources) seeds were sprayed with the aqueous compositions according to the formulation in Table 1 above. The dosage of the treatment was 2 g cationic guar/1000 g seeds. Subsequently, the treated seeds were dried in a fume hood at the room temperature overnight. Then the dried seeds were planted in paper rolls saturated with water. Then the paper rolls carrying the Corn plants were kept in germination boxes with lid covers, being exposed to LED light. The germination tests were conducted at 23° C. The root length of the Corn plants was measured at different time point post planting. For the measurement, the paper rolls were removed and then the root length of the Corn plants was measured manually. The average was calculated (n=40). Results were shown in Table 2 below.

TABLE 2

| Days post planting | Average root Length (mm) | | |
| --- | --- | --- | --- |
| | S1 | CS1 | CS2 |
| 3 | 19.1 | 15.2 | 13.9 |
| 5 | 76.6 | 63.9 | 57.4 |
| 6 | 106.3 | 99.9 | 96.4 |

As shown in Table 2, the Corn plants of which the seeds were treated with the cationic guar according to the present invention (S1) exhibited more robust root growth in comparison to the untreated group (CS2) and the plants of which the seeds were treated with a high molecular weight cationic guar (CS1).

Enhancement of Root Growth of Wheat

Wheat (*Triticum aestivum* L., from commercial sources) seeds were sprayed with aqueous compositions according to the formulation in Table 1 above. The dosage of the treatment was 2 g cationic guar/1000 g seeds. Subsequently, the treated seeds were dried in a fume hood at the room temperature overnight. Then the dried seeds were planted on filter paper saturated with water. Then the filter paper carrying the Wheat plants were kept in germination boxes with lid covers, being exposed to LED light. The germination tests were conducted at 23° C. The root length of the Wheat plants was measured at 5 days post planting. For the measurement, the filter paper was removed and then the root length of the wheat plants was measured manually. The average was calculated (n=40). Results were shown in Table 3 below. In addition, the number of roots having a length above 100 mm, and the number of seeds in which all 3 roots of each seed were above 100 mm as well, were counted at 5 days post the planting. The results of the counting were shown in Table 4 below.

TABLE 3

| Formulation | Average root Length (mm) |
| --- | --- |
| S1 | 113.03 |
| CS1 | 106.3 |
| CS2 | 101.77 |

As shown in Table 3, the Wheat plants of which the seeds were treated with the cationic guar according to the present invention exhibited more robust root growth in comparison to the untreated group and the plants of which the seeds were treated with a high molecular weight cationic guar.

TABLE 4

| Formulation | Number of roots having a length above 100 mm | Number of seeds in which all 3 roots of each seed were above 100 mm |
| --- | --- | --- |
| S1 | 25 | 6 |
| CS1 | 21 | 4 |
| CS2 | 14 | 1 |

As shown in Table 4, the Wheat plants of which the seeds were treated with the cationic guar according to the present invention yielded the highest number of roots having a length above 100 mm and the highest number of seeds in which all 3 roots of each seed were above 100 mm.

Example 2

Formulation

Aqueous compositions for seed treatment were prepared according to the formulations in Table 5 below:

TABLE 5

| | Formulation |
| --- | --- |
| Sample 2 (S2) | An aqueous solution comprising 1 wt % of a guar hydroxypropyltrimonium chloride having an average molecular weight of approximately 35,000 Daltons and a DS of 0.2 |
| Sample 3 (S3) | An aqueous solution comprising 1 wt % of a guar hydroxypropyltrimonium chloride having an average molecular weight of approximately 22,000 Daltons and a DS of 0.2 |
| Sample 4 (S4) | An aqueous solution comprising 1 wt % of a guar hydroxypropyltrimonium chloride having an average molecular weight of approximately 10,000 Daltons and a DS of 0.2 |
| Comparative Sample 3 (CS3) | An aqueous solution comprising 1 wt % of a cationic guar having an average molecular weight of approximately 1,500,000 Daltons and a DS of 0.1 |
| Comparative Sample 4 (CS4) | Water without any cationic guar |

Enhancement of Growth of Wheat

Wheat (*Triticum aestivum* L., from commercial sources) seeds were sprayed with aqueous compositions according to the formulations in Table 5 above, respectively. One hundred seeds were included for each treatment group. The dosage of the treatment was 2 g cationic guar/1000 g seeds. Subsequently, the treated seeds were dried in a fume hood at the room temperature overnight. Then the dried seeds were planted on filter paper saturated with water. Then the filter paper carrying the Wheat plants were kept in germination boxes with lid covers, being exposed to LED light. The germination tests were conducted at 23° C. The seedling length and the root length of the Wheat plants were measured at 70 hours post planting. For the measurement, the filter paper was removed, the seedling length and the root length of the Wheat plants were measured manually. The average was calculated. Results were shown in Table 6 below. In addition, the numbers of seeds which had developed 4 roots or more than 4 roots were counted at 70 hours post the planting. For the counting, only roots having a length of at least 2 mm were counted. The results of the counting were also shown in Table 6 below:

TABLE 6

| Formulation | Seedling Height (mm) | Root Length (mm) | Number of seeds having 4 roots or more than 4 roots |
|---|---|---|---|
| S2 | 15.29 | 14.3 | 42 |
| CS3 | 13.73 | 13.18 | 33 |
| CS4 | 13.04 | 12.29 | 18 |

Results showed that seeds treated with the cationic guar according to the present invention led to more robust plant growth compared to those treated with high molecular weight cationic guar and those untreated.

Enhancement of Germination of Corn

Corn (Zea mays, from commercial sources) seeds were sprayed with the aqueous compositions according to the formulations in Table 5 above, respectively. One hundred seeds were included for each treatment group. The dosage of the treatment was 2 g cationic guar/1000 g seeds. The seeds were placed on a germination paper (from the Anchor Company) which was put in a germination box (12 cm×12 cm×6 cm, from the Anchor Company). Ten (10) ml of water were added to the bottom of the germination box. The germination box was sealed with a lid and then placed in a climate chamber which was exposed to LED light. The temperature was maintained at 20° C. At 66 hours post planting, the number of seeds which had developed a root of at least 2 mm was counted. The results are shown in Table 7 below:

TABLE 7

| Formulation | Germination Number |
|---|---|
| S3 | 60 |
| S4 | 68 |
| CS4 | 45 |

Results showed that seeds treated with the cationic guars according to the present invention had higher germination numbers compared to untreated seeds.

Example 3

Formulation

Granule compositions for seed treatment were prepared according to the formulations in Table 8 below:

TABLE 8

| | Formulation |
|---|---|
| Sample 5 (S5) | Granules comprising 7.4 wt % of a guar hydroxypropyltrimonium chloride having an average molecular weight of approximately 50,000 Daltons and a DS of 0.2, and 92.6 wt % of $CaCO_3$ |

Sands were mixed with granules according to Sample 5 in an amount of 741 g of granules in 1 $m^3$ of the sands and with a water content of 9 wt % based on the total weight. 1250 grams of the sands with the granules were placed in a box (12 cm×18 cm×5.5 cm) and 50 seeds of Corn (Zea mays, from commercial sources) were planted in the sands in a depth of 2 cm below the top of the sands. In the control group, sands without any granules added were used for the experiments. The box was sealed with a lid and placed in an incubator. The incubator was subject to multiple cycles of alternative temperatures, wherein the temperature was kept at 20° C. for 16 hours and at 30° C. for 8 hours in each cycle.

At 4 days post planting, the number of seeds in which the seedling emerged was counted and then divided by the number of seeds planted (50). Such rate was denoted as germination energy. Results were shown in Table 9 below:

TABLE 9

| | S5 | Control |
|---|---|---|
| Germination Energy | 88% | 64% |

Results showed that the cationic guar granules according to the present invention led to higher germination energy.

Enhancement of Growth of Chinese Cabbage 100 seeds of Chinese Cabbage (Brassica rapa, from commercial sources) were planted in sands. The sands had a water content of 35 wt %. The seeds were planted with a depth of 1 cm below the top of the sands. Then granules according to Sample 5 were spread onto the top of the sands (20 kg granules per hectare of the surface of the sands). In the control group, no granules were spread. Then the seeds were incubated in a greenhouse at 20° C. and subject to natural light. After 72 hours, the seedling height was measured. Also, the number of abnormal seedling was counted. For such counting, seedlings having a height of 1 mm or above 1 mm were deemed as normal seedlings and the rest were deemed as abnormal seedlings. Results were shown in Table 10 below:

TABLE 10

| | Sample 5 | Control |
|---|---|---|
| Seedling height (mm) | 38 | 29 |
| Number of abnormal seedlings | 24 | 31 |

Results showed that the cationic guar granules according to the present invention could lead to more robust seedling growth and lower rate of the abnormal seedlings.

The invention claimed is:

1. A method for increasing the growth of a plant which comprises the step of contacting a seed of said plant with a composition comprising guar hydroxypropyltrimonium chloride having an average molecular weight of between 10,000 Daltons and 50,000 Daltons and having a Degree of Substitution of between 0.005 and 3,
wherein the composition is in the form of a liquid composition or a solid composition, wherein the liquid composition is a suspension, a dispersion, a slurry, or a solution in a liquid carrier selected from water, organic solvents, oils or a mixture thereof, and the solid composition is a powder, a particle, an agglomerate, a flake, a granule, a pellet, a tablet, or a paste.

2. The method according to claim 1, wherein the method comprises coating the seed of said plant with said composition.

3. The method according to claim 1, wherein the method comprises at least the steps of:
a) the seed of said plant is implanted in a hole or a furrow in the soil; and
b) said composition is applied to surround or partially surround, or to be adjacent to the seed of said plant so that the seed of said plant comes into contact with said composition.

4. The method according to claim 1, wherein said composition further comprises a carrier.

5. The method according to claim 1, wherein the method comprises at least the steps of:
   a) administering said composition to soil in which said plant is cultivated; and
   b) the seed of said plant is applied to the soil so that the seed of said plant comes into contact with said composition.

6. The method according to claim 1, wherein said plant is selected from the group consisting of: corn, wheat, *sorghum*, soybean, tomato, cauliflower, radish, cabbage, canola, lettuce, rye grass, grass, rice, cotton, sunflower, and mixtures thereof.

7. The method according to claim 1, wherein the guar hydroxypropyltrimonium chloride has a Degree of Substitution of between 0.005 and 1.

8. The method according to claim 1, wherein the cationic guar hydroxypropyltrimonium chloride has a Degree of Substitution of between 0.12 and 0.5.

9. The method according to claim 1, wherein said composition further comprises a bioactive ingredient.

10. The method according to claim 1, wherein said composition further comprises a plant biostimulant.

11. The method of claim 1, wherein the guar hydroxypropyltrimonium chloride is from 1 wt % to 60 wt % based on the total weight of the composition.

12. The method of claim 1, wherein the composition does not include a surfactant.

13. A seed coated with a composition comprising at least guar hydroxypropyltrimonium chloride,
   wherein the guar hydroxypropyltrimonium chloride has an average molecular weight of between 10,000 Daltons and 50,000 Daltons and having a Degree of Substitution of between 0.005 and 3, and
   wherein the composition is in the form of a liquid composition or a solid composition, wherein the liquid composition is a suspension, a dispersion, a slurry, or a solution in a liquid carrier selected from water, organic solvents, oils or a mixture thereof, and the solid composition is a powder, a particle, an agglomerate, a flake, a granule, a pellet, a tablet, or a paste.

14. The seed of claim 13, wherein the guar hydroxypropyltrimonium chloride is from 1 wt % to 60 wt % based on the total weight of the composition.

15. The seed of claim 13, wherein the composition does not include a surfactant.

\* \* \* \* \*